S. C. MAINE.
Assignor to THE NEW ENGLAND WARDROBE BEDSTEAD CO.
Wardrobe-Bedstead.
No. 8269. Reissued June 4, 1878.
Fig. 1
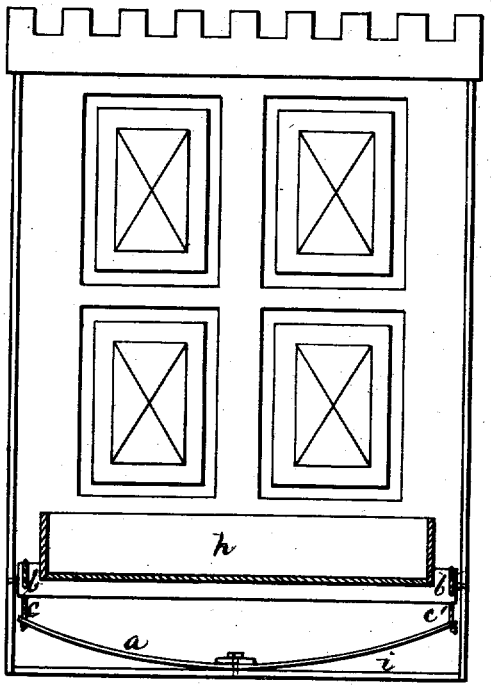
Fig. 2
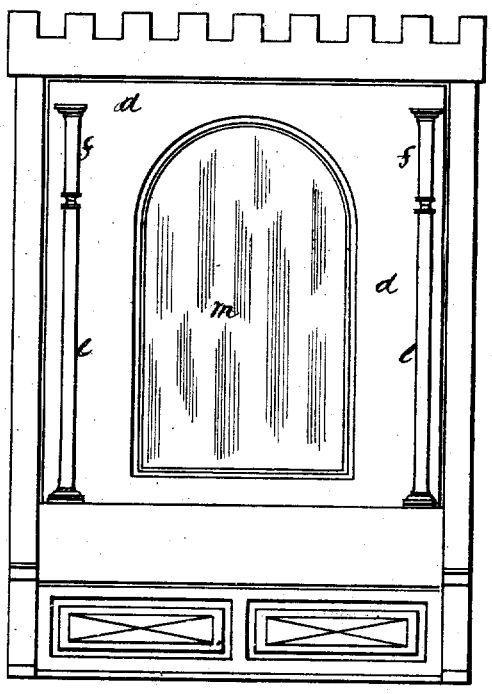
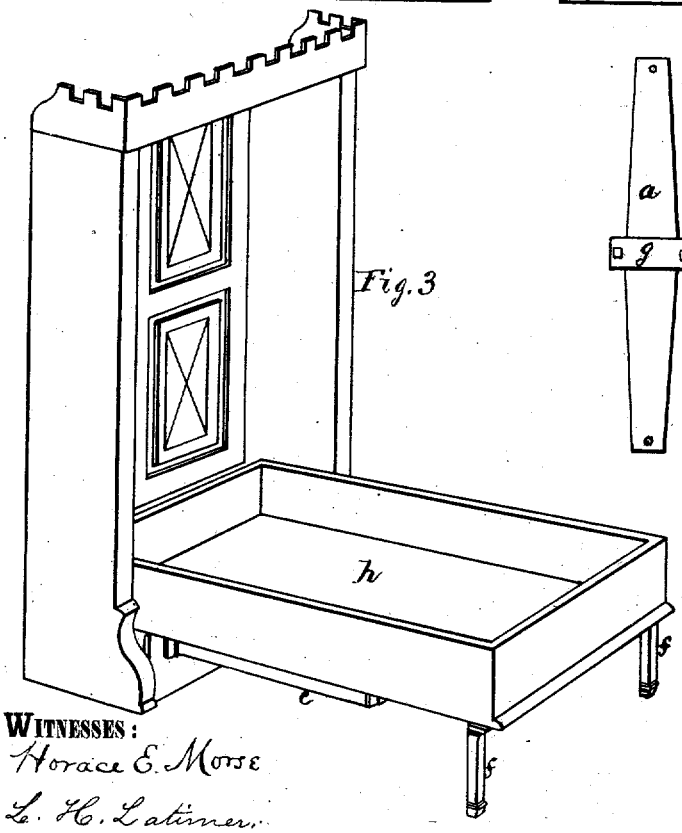
Fig. 3
Fig. 5
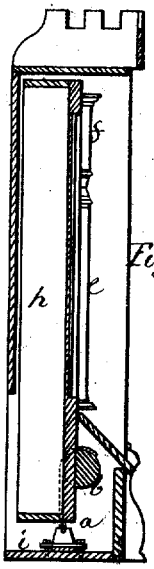
Fig 4
WITNESSES:
Horace E. Morse
L. H. Latimer.
S. C. Maine
INVENTOR
BY J. H. Adams
ATTORNEY.
N. PETERS, PHOTO-LITHOGRAPHER, WASHINGTON, D. C.

UNITED STATES PATENT OFFICE.

SEBEUS C. MAINE, OF BOSTON, MASSACHUSETTS, ASSIGNOR TO THE NEW ENGLAND WARDROBE BEDSTEAD COMPANY.

IMPROVEMENT IN WARDROBE-BEDSTEADS.

Specification forming part of Letters Patent No. 63,065, dated March 19, 1867; Reissue No. 8,269, dated June 4, 1878; application filed October 11, 1877.

*To all whom it may concern:*

Be it known that I, SEBEUS C. MAINE, of Boston, in the county of Suffolk and State of Massachusetts, have invented an Improved Balanced Bed and Bedstead, of which the following is a description, reference being had to the accompanying drawings, in which—

Figure 1 is a sectional elevation, the bed being down, as in Fig. 3. Fig. 2 is a front elevation, showing the bed closed up. Fig. 3 is a perspective view, with the bed down. Fig. 4 is a central transverse vertical section. Fig. 5 is a plan view of the spring and the plate used for securing it to the bottom of the wardrobe.

My invention has for its object to provide a bedstead requiring the least possible space, to be operated without noise or appreciable labor, and at a moderate price; and it consists of an upright frame or case resembling any article of furniture desired, such as a book-case, wardrobe, or sideboard.

The front may be plain, paneled, or it may contain a mirror. The front or face of the piece of furniture selected becomes, when used as a bedstead, the bottom of an inner case, which contains the bed and bedding.

*d* represents the front of the wardrobe, and contains a mirror, *m*. *h* is the inner case, which contains the bed and bedding.

The inner case or frame *h* is secured by bolts or screws to a shaft, *b*, crossing the frame at any desired distance from the lower end, the shaft turning on proper bearings at each end. Under the shaft *b*, upon the bottom of the frame *i*, and parallel with the shaft is a flat spring, *a*, secured at its center to the bottom by means of a cap, *g*, which holds the spring in place. The spring *a* is attached at each end to the shaft *b* by means of chains *c*, or any suitable cord or strap. Coiled or wound springs can be used.

When a spring of proper strength is thus applied, the bed or inner case can be dropped or swung out from the frame without noise, and requiring but little strength, as the increased weight of the inner case and bed is balanced by the increased power of the spring.

On the front of the case *d* is an ornamental finish, *e e f f*, the lower portion, *e e*, being fixed to the case. The upper portion, *f f*, is connected to the case at its upper ends by means of hinges, or in such a manner that when the inner case has been lowered to a level with the bearing of the shaft the portions *f f* drop by their own weight and become legs or supports for the bottom of the bedstead.

In closing the bedstead, the only labor required is to give it a gentle motion upward, when, with the assistance of the spring, the whole at once assumes its original shape. When the inner case, with the bed, has been dropped to a line at right angles with the outer case or frame, the weight of the inner case and bed become greatest, acting as a lever upon the shaft. At the same time the power of the spring is greatest, and acting also upon the shaft. The same balancing power also acts in closing. As the bed advances toward the case the weight becomes less until it stands erect in the frame, when the force of a pound's weight will hold it in place. When the bed stands erect the spring is at rest.

I am aware of previously-existing patents wherein are shown automatically-adjustable supports, serving as ornamental pieces when the bed-casing is erect.

What I claim as my invention, and desire to secure by Letters Patent, is—

1. A balance-spring located at the bottom of the casing, and combined with the movable bed-frame by means of flexible cords or chains wound upon a shaft which moves with said bed-frame, substantially as shown and described.

2. The combination of spring *a*, secured to the casing, cords or chains *c*, shaft *b*, and movable bed-frame *h*, the several parts being arranged substantially as shown and described.

In witness whereof I have hereunto signed my name to this specification.

S. C. MAINE.

Witnesses:
J. H. ADAMS,
L. H. LATIMER.